J. DAIN.
HAY LOADER.
APPLICATION FILED FEB. 9, 1914.
1,237,305.
Patented Aug. 21, 1917.
3 SHEETS—SHEET 1.
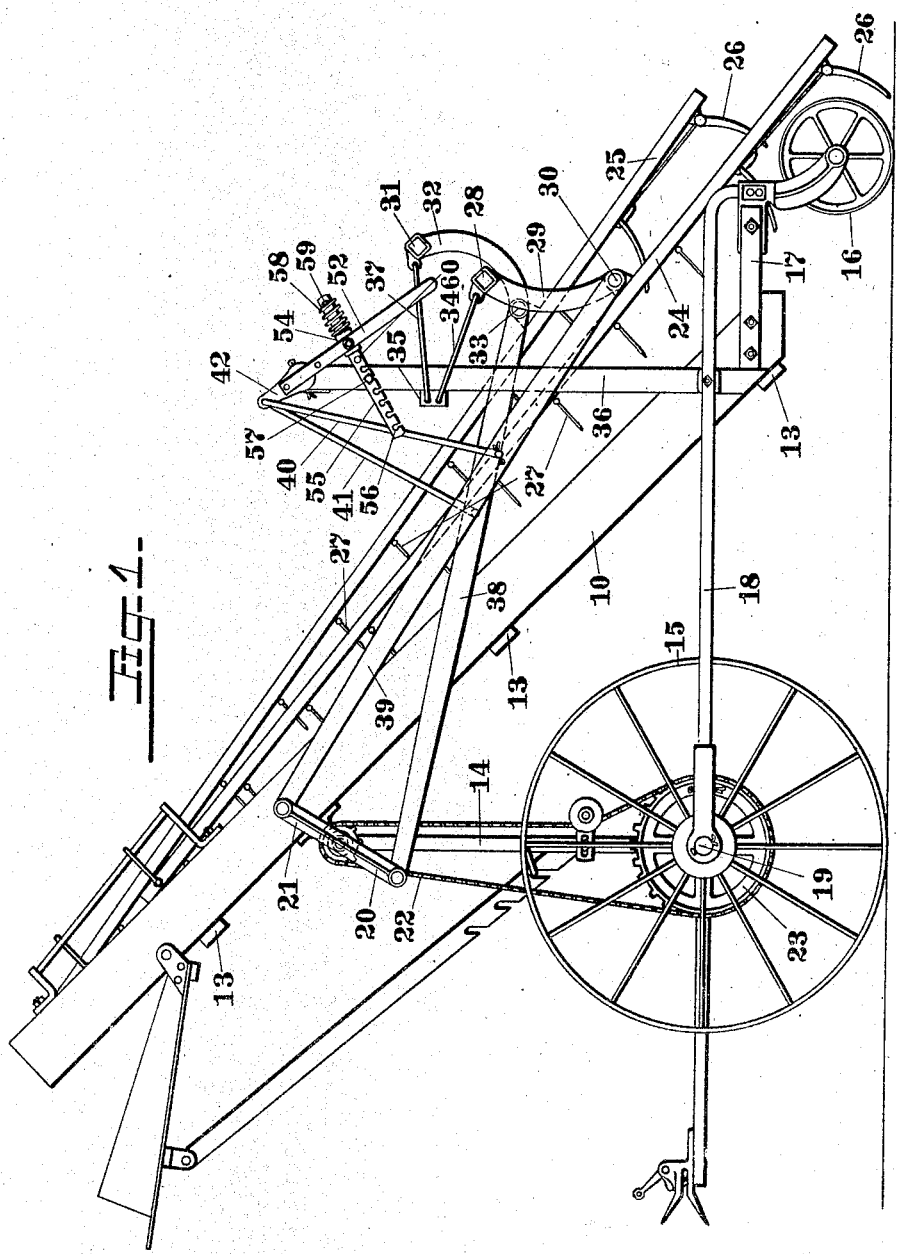

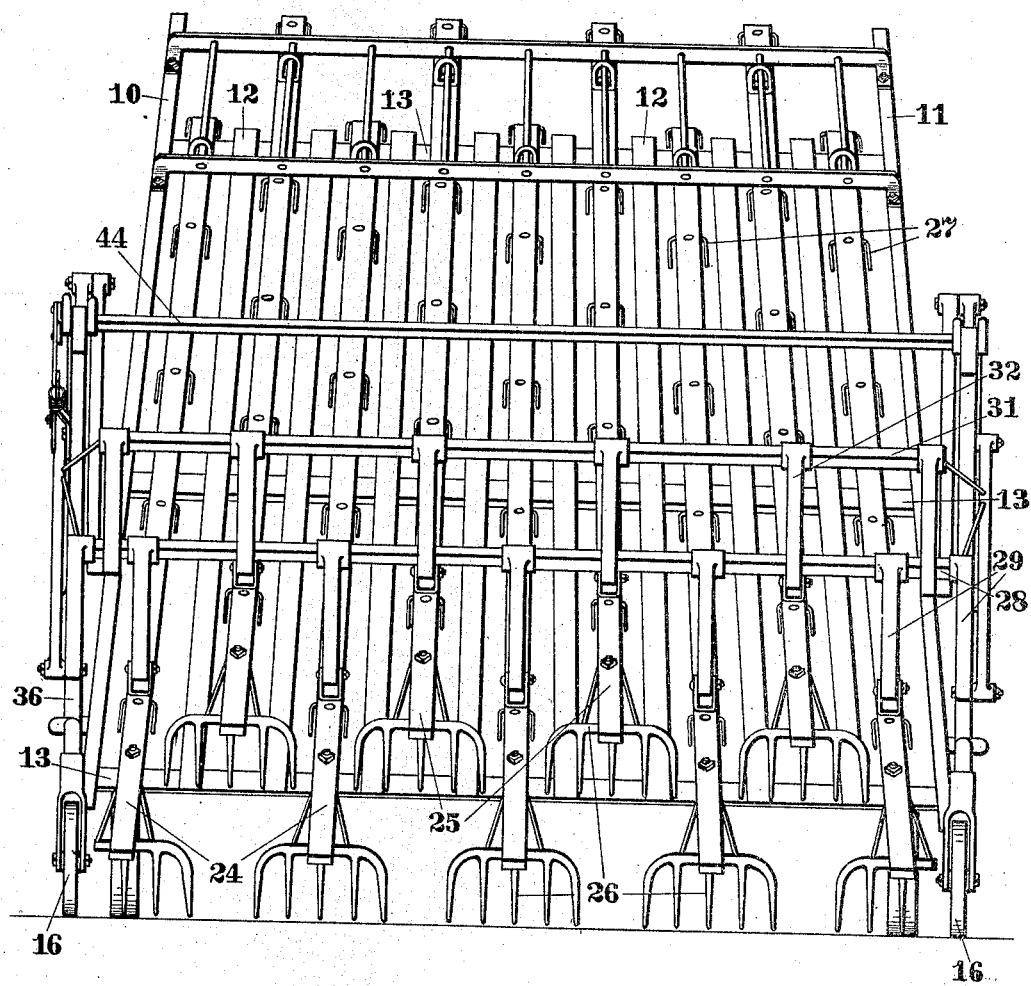

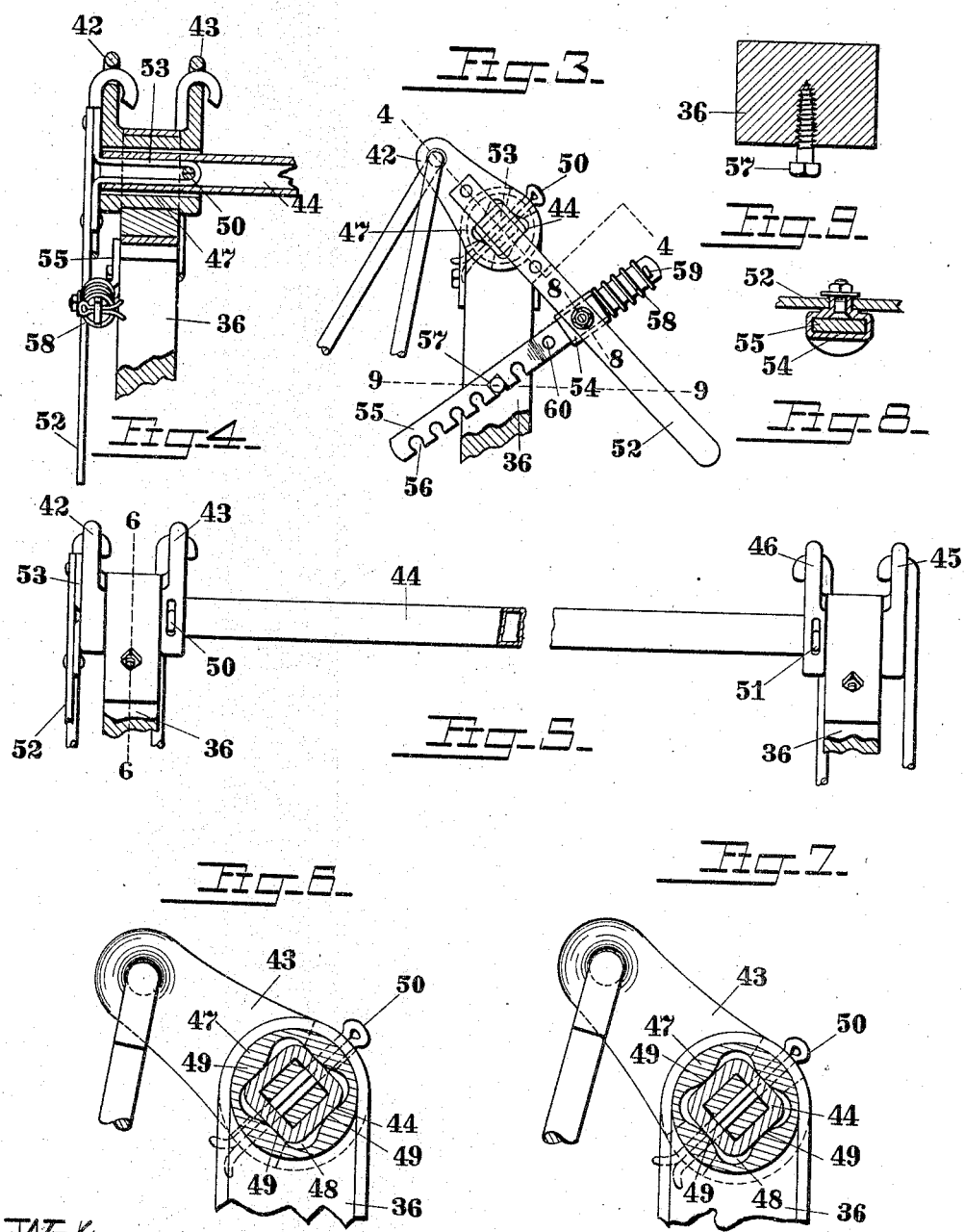

UNITED STATES PATENT OFFICE.

JOSEPH DAIN, OF MOLINE, ILLINOIS, ASSIGNOR TO DAIN MANUFACTURING COMPANY OF IOWA, OF OTTUMWA, IOWA, A CORPORATION OF IOWA.

HAY-LOADER.

1,237,305.      Specification of Letters Patent.      Patented Aug. 21, 1917.

Application filed February 9, 1914. Serial No. 817,673.

*To all whom it may concern:*

Be it known that I, JOSEPH DAIN, a citizen of the United States, and a resident of Moline, in the county of Rock Island and State of Illinois, have invented certain new and useful Improvements in Hay-Loaders, of which the following is a specification, reference being had to the accompanying drawings.

My invention relates to hay loaders of the type illustrated and described in Letters Patent of the United States, No. 961,757, granted to me June 21, 1910, comprising an inclined elevator frame over which operate two rake-frames which are reciprocated over the elevator frame in such manner as to carry up hay thereon on their respective up-strokes, while on their down-strokes their lower ends are moved out from the elevator frame so that when the rake-frames again move upward the rake-heads carried by them act to gather the hay and carry it up over the elevator frame to the upper end thereof where it is discharged. The rake-frames are reciprocated by means of pitmen, two at each side of the machine, operated by cranks driven from the main carrying wheels, the elevator frame being supported upon such wheels and also upon caster wheels or runners placed adjacent to the lower end of the elevator frame.

My present invention has to do with supporting devices for suspending the rake-frames over the elevator frame, and has for its object to provide for yieldingly supporting the lower end portions of the rake-frames, and to provide means for readily adjusting the height from the ground at which the rake-heads operate. The best operating conditions for hay loaders vary with the character of the meadow. For example, in an extremely rough meadow the rake-heads or forks are usually set a little higher from the ground so that they will not strike the hummocks, and when manure has been spread upon the meadow it is desirable to adjust the forks a sufficient distance from the ground so that when gathering the hay they will rake above the manure and will not disturb the mulch. It is also desirable that the rake-heads be flexibly or yieldingly supported so that when traveling over rough ground if they are thrown up by striking obstacles they will be cushioned when falling again. It is also desirable that the forks and pitmen at one side of the machine be capable of rising and falling independently of those of the other side, thus reducing the strains which the rake-frames as a whole are subjected to, as well as making the machine operate more easily. I accomplish my object as illustrated in the accompanying drawings and as hereinafter described. What I regard as new is set forth in the claims.

In the accompanying drawings,—

Figure 1 is a side elevation of my improved hay loader;

Fig. 2 is a rear view thereof;

Fig. 3 is an enlarged detail, being a side view, showing the devices by which the pitmen are suspended and the lower ends of the rake-frames supported and adjusted;

Fig. 4 is an enlarged detail, being a section on line 4—4 of Fig. 3;

Fig. 5 is an elevation of certain of the parts shown in Fig. 3, the shaft being partly broken away;

Figs. 6 and 7 are sectional views on line 6—6 of Fig. 5 showing two positions of the rocking arms from which the pitmen are suspended;

Fig. 8 is a section on line 8—8 of Fig. 3; and

Fig. 9 is a cross-section on line 9—9 of Fig. 3, the adjusting-bar being omitted.

Referring to the drawings,—

10—11 indicate the side members of the usual elevator frame, which comprises also longitudinal strips 12 and transverse strips 13. 14 indicates a supporting frame upon the upper end portion of which the elevator frame is pivoted intermediately of its length, said frame 14 being mounted on carrying-wheels 15. 16 indicates caster wheels which support the lower rear portion of the elevator frame, being mounted in suitable bearings provided in brackets 17, secured to the side members 10—11, as shown in Fig. 1. 18 indicates braces connecting the brackets 17 with the main axle 19 of the machine. 20—21 indicate cranks mounted at the sides of the machine upon the frame 14 and arranged to be driven by chains 22 from sprocket-wheels 23 mounted on the axle 19, or otherwise arranged so as to be driven by the wheels 15, the arrangement being such that as the machine progresses the cranks 20—21 are rotated.

24 indicates the rake-bars constituting one rake-frame, and 25 the rake-bars constituting the other rake-frame. The rake-bars of the two rake-frames alternate and are each provided at their lower ends with rake-heads or forks 26. They are also provided intermediately with a series of teeth 27 which operate to advance the hay up over the elevator frame in the usual way as the rake-frames are reciprocated. The several rake-bars 24 constituting one of the rake-frames are connected together by a transverse-bar 28, preferably in the form of a square tubular shaft, each of said rake-bars having an arm 29 pivoted at its lower end to the rake-bar, as shown at 30 in Fig. 1, its upper end being rigidly connected with the bar 28. In like manner each of the rake-bars 25 is connected to a transverse-bar 31 by an arm 32, pivoted at 33 to the rake-bar. The transverse-bar 28 is connected at or near its ends by links 34 with vertically-adjustable blocks 35, supported by uprights 36, secured to the side members 10—11 of the elevator frame, as also shown in Fig. 1; and in like manner the transverse-bar 31 is connected by links 37 with said blocks 35. The blocks 35 are suitably suspended from the upper end portions of the uprights 36, as for example, by devices such as are shown in my said Patent No. 961,757. By adjusting the blocks 35 vertically the paths of the rake-frames may, to a certain extent, be adjusted or varied. This construction, however, separately considered, forms no part of my present invention. 38 indicates pitmen, one at each side of the machine, which connect the cranks 20 with the pivots 33, and 39 indicates pitmen which connect the cranks 21 with the pivots 30. The pitmen 38—39 are fulcrumed intermediately of their length upon swinging links 40—41, respectively. The links 40—41 at one side of the machine, in the illustration the left-hand side, are pivotally connected respectively to arms 42—43, mounted upon a transverse shaft 44, which is journaled in the upper end portions of the standards 36, as best shown in Fig. 5. In like manner the links at the opposite side of the machine are pivotally connected to arms 45—46, respectively, secured upon the opposite end portion of the shaft 44. It will be apparent, therefore, that by rocking the shaft 44 the arms 42—43—45—46 carried thereby may be rocked, thereby raising or lowering the links 40—41 and correspondingly adjusting the position of the fulcra of the several pitmen 38—39, thus varying the paths of the two rake-frames. It is desirable that the arms 42—43—45—46 have a limited movement independently of the shaft 44 in order to permit the rake-bars at one side of the machine to rise and fall independently of those at the other side, as when they encounter an obstruction, such as a rock, or are operating over uneven ground. This is provided for as follows:

As best shown in Figs. 5 and 6, the shaft 44 is substantially square in cross-section but has its edges rounded and the several arms 42—43—45—46 are provided with sleeves 47 which fit upon the shaft. The openings through said sleeves, however, do not fit closely upon the entire periphery of the shaft, but are provided with recesses 48 opposite the corners of the shaft and with bearing portions 49 between said recesses, as best shown in Figs. 6 and 7. It will be apparent that, as illustrated in said figures, the several arms 42—43—45—46 are capable of a limited rocking movement independently of the shaft in either direction from the neutral position shown in Fig. 7. Each pair of said arms may move independently of the other pair to a limited extent, and consequently the pairs of pitmen may move correspondingly to allow either side of the rake-frames to accommodate themselves to inequalities in the ground, or to obstructions encountered by its raking devices. In order to prevent endwise movement of the transverse shaft 44, cotter pines 50—51 are provided, which, in the illustration, pass through the arms 43 and 46 and the shaft 44, as shown in Figs. 5 and 6. The slots in the arms 43—46 through which the cotter pins pass are elongated to permit of the independent movement of said arms above described.

For the purpose of positively adjusting the position of the pitmen and also of yieldingly supporting them, and through them the rake-frames, a lever 52 is provided which is secured to the shaft 44. In the construction illustrated this lever is connected with the shaft 44 by means of a U-shaped strap 53, the doubled portion of which is inserted in the end of the shaft 44, as best shown in Fig. 4, its ends being folded back and riveted to the lever 52 adjacent to the arm 42. The cotter pin 50 passes through the loop of the strap 53, as shown in Fig. 4, and holds it in position. The lever 52 is provided with a swiveled sleeve 54 which embraces a locking-bar 55 having a series of notches 56, as shown in Fig. 3, said notches being adapted to fit upon a bolt 57, or other suitable stop, screwed into one of the uprights 36, as shown in Figs. 3 and 9. 58 indicates a spring mounted on the locking-bar 55 at the opposite side of the sleeve 54 from the notches 56, said spring bearing at one end against a pin 59 in said bar 55, and at the other end against the sleeve 54, the arrangement being such that the spring 58 operates normally to swing the lever 52 in such direction as to rock the shaft 44 to lift the rake-frames. At the opposite side of the bar 55 from the spring 58, said bar is provided with a stop 60 which limits the movement of the sleeve 54 in the opposite direction.

The operation of this part of the apparatus is as follows: The weight of the pitmen and rake-frames tends to swing the arms 42—43—45—46 downward and to rock the shaft 44 accordingly. This throws the lever 52 outward or upward against the spring 58, which accordingly yieldingly supports the rake-frames. By swinging the lever 52 downward the locking-bar 55 may be released from the bolt 57 and adjusted longitudinally so as to vary the height at which the pitmen are normally supported, and correspondingly vary the paths of the raking devices. As the lever 52 is connected with the shaft 44, it will be apparent that the pitmen at both sides of the machine are simultaneously and uniformly adjusted. It will be evident from the foregoing description that while the raking devices can be evenly adjusted by a single lever, the supporting devices at the opposite sides of the machine are capable of independent movement, to a limited extent, to enable the raking devices to accommodate themselves to obstructions or inequalities in the ground.

That which I claim as my invention, and desire to secure by Letters Patent, is—

1. In a hay loader, the combination of an elevator frame, raking devices above said elevator frame, pitmen connected with said raking devices for actuating the same, swinging supports on the lower end portions of which said pitmen are fulcrumed, a lever, and rocking means operated by said lever to simultaneously adjust the position of said swinging supports at both sides of the loader.

2. In a hay-loader, the combination of an elevator-frame, raking devices above said elevator-frame, pitmen connected with said raking devices for actuating the same, swinging supports on which said pitmen are fulcrumed, a lever, rocking arms connected with said swinging supports, and means operatively connecting said lever with said arms whereby said swinging supports may be adjusted by operating said lever, said arms being capable of a limited rocking movement independently of said lever.

3. In a hay loader, the combination of an elevator frame, raking devices above said elevator frame, pitmen connected with said raking devices for actuating the same, swinging supports on which said pitmen are fulcrumed, a lever for adjusting the position of said swinging support, and a spring acting upon said lever in opposition to the weight of the pitmen and raking devices.

4. In a hay loader, the combination of an elevator frame, raking devices above said elevator frame, pitmen connected with said raking devices for actuating the same, swinging supports on which said pitmen are fulcrumed, a lever for adjusting the position of said swinging supports, a bar movably connected with said lever and adjustably connected with the machine frame, and a spring interposed between said lever and said bar for yieldingly supporting said raking devices.

5. In a hay loader, the combination of an elevator frame, raking devices above said elevator frame, pitmen connected with said raking devices for actuating the same, swinging supports connected with said pitmen, a rock-shaft, arms connecting the upper end portions of said swinging supports to said rock-shaft, a lever for rocking said shaft, and means acting upon said lever to yieldingly hold it in position.

6. In a hay loader, the combination of an elevator frame, raking devices above said elevator frame, pitmen connected with said raking devices for actuating the same, swinging supports connected with said pitmen, a rock-shaft, arms connecting the upper end portions of said swinging supports to said rock-shaft, a lever for rocking said shaft, means for securing said lever in different positions of adjustment, and a spring acting on said lever to yieldingly support the raking devices.

7. In a hay loader, the combination of an elevator frame, raking devices above said elevator frame, pitmen connected with said raking devices for actuating the same, swinging supports connected with said pitmen, a rock-shaft, arms movably connected to said rock-shaft, so as to have a limited movement independently thereof, said swinging supports being connected to said arms, and a lever for rocking said shaft.

8. In a hay-loader, the combination of an elevator-frame, raking mechanism above said elevator-frame, a lever mounted above the elevator-frame, a member movably connected with said lever and adjustably connected with the elevator-frame, means connecting said lever with said raking mechanism, and a spring interposed between said lever and said adjustable member.

9. In a hay-loader, the combination of an elevator-frame, raking mechanism above said elevator-frame, a rock-shaft mounted above the elevator-frame, an arm mounted on said rock-shaft and having a limited movement independently thereof, means connecting said arm with said raking mechanism, and a lever for rocking said rock-shaft.

10. In a hay loader, the combination of an elevator frame, rake-frames above said elevator frame, a pair of pitmen at each side of said elevator frame and connected with said rake-frames, respectively, swinging supports for said pitmen, a rock-shaft, arms mounted on said rock-shaft and connected with said swinging supports, said arms having a limited movement independently of said rock-shaft, a lever for rocking said shaft, and a spring normally exerting a lifting effect on said lever.

11. In a hay loader, the combination of an elevator frame, rake-frames operating thereover, pitmen for operating said rake-frames, swinging supports for said pitmen, a rock-shaft substantially square in cross-section and having its corners rounded, arms connected with said swinging supports and having passages to receive the rock-shaft, said passages being arranged to permit a limited rocking movement of said arms upon said rock-shaft, and a lever for rocking said shaft.

12. The combination with a tubular shaft non-circular in cross-section internally, of a lever, and means connecting said lever with said shaft, comprising a U-shaped member fitted into one end of said shaft and secured to said lever.

13. In a hay-loader, the combination of an elevator-frame, raking devices above said elevator-frame, pitmen connected with said raking devices for actuating the same, swinging supports on the lower end portions of which said pitmen are fulcrumed, a lever, connections operated by said lever for simultaneously adjusting the position of said swinging supports at both sides of the machine, and means for securing said lever in different positions of adjustment.

14. In a hay-loader, the combination of an elevator-frame, raking devices above said elevator-frame, pitmen connected with said raking devices for actuating the same, swinging supports on which said pitmen are fulcrumed, a lever for adjusting the position of said swinging supports, means for securing said lever in different positions of adjustment, and a spring acting upon said lever in opposition to the weight of the pitmen and the raking devices.

15. In a hay-loader, the combination of an elevator-frame, raking devices above said elevator-frame, pitmen connected with said raking devices for actuating the same, swinging supports at opposite sides of the loader on which said pitmen are fulcrumed, a lever, means actuated by said lever to simultaneously adjust the swinging supports at both sides of the loader, and a spring acting upon said lever in opposition to the weight of the pitmen and the raking devices.

JOSEPH DAIN.

Witnesses:
 JESSIE L. SIMSER,
 W. G. DUFFIELD.

Copies of this patent may be obtained for five cents each, by addressing the "Commissioner of Patents, Washington, D. C."